May 14, 1963 D. G. SMITTLE 3,089,564
ENERGY ABSORPTION UNIT FOR SEAT BELTS AND THE LIKE
Filed Dec. 5, 1961
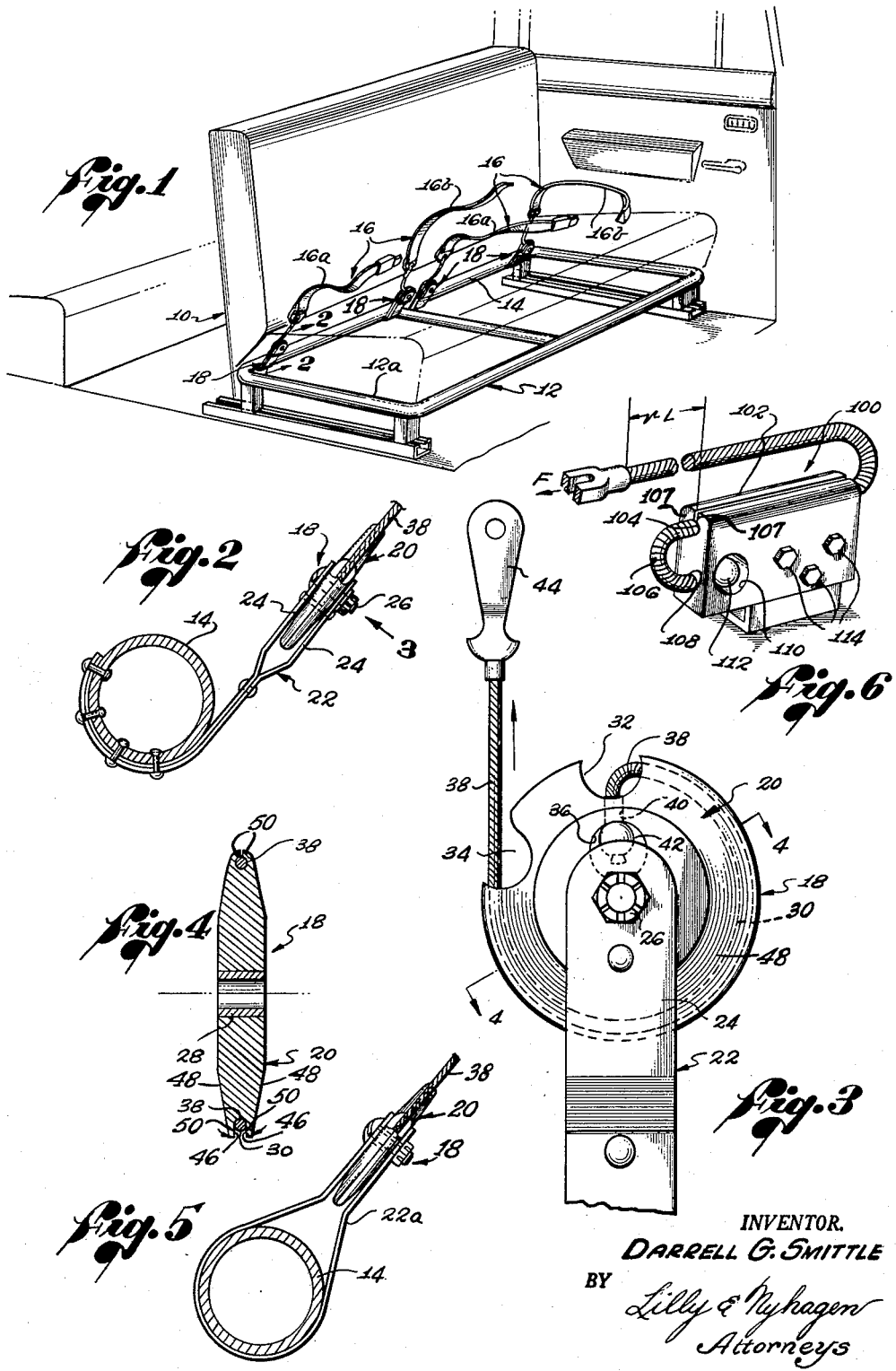
INVENTOR.
DARRELL G. SMITTLE
BY
Lilly & Nyhagen
Attorneys

United States Patent Office 3,089,564
Patented May 14, 1963

3,089,564
ENERGY ABSORPTION UNIT FOR SEAT BELTS AND THE LIKE
Darrell G. Smittle, Van Nuys, Calif., assignor to Hardman Tool & Engineering Co., Los Angeles, Calif., a corporation of California
Filed Dec. 5, 1961, Ser. No. 157,237
7 Claims. (Cl. 188—1)

This invention is concerned generally with the absorption of the kinetic energy of a moving object which is abruptly decelerated and relates, particularly, to improved energy absorption devices for this purpose.

Energy absorption devices of the type to which this invention pertains are incorporated in safety seat belts for automobiles and airplanes, in cargo lines for securing cargo in position during transportation in land vehicles and airplanes, in parachutes, and in other similar applications to absorb the kinetic energy of the restrained person or object during abrupt deceleration of the person or object as occurs during an impact in an automotive vehicle, a crash landing of an airplane, and opening of a parachute canopy. Absorption of the kinetic energy of the restrained person or object over an interval of time, in this way, greatly reduces the deceleration force imposed on the person or object and/or prevents parting of the restraining belt or lines.

The primary requisites of an energy absorption device for the purpose described are (1) absence of rebound of the restrained person or object following the period of deceleration, (2) limited yield distance, (3) uniform re-restraining force throughout the entire yield distance, (4) compactness and economy of manufacture, and (5) reusability.

In the case of an energy absorption device for use in conjunction with a safety seat belt for an automotive vehicle, for example, rebound of the restrained person after impact, as would occur with a safety belt utilizing a spring as the energy absorption medium, might very well cause injury to the person. Moreover, if yielding of the energy absorption device under load is not limited, the person restrained by the safety belt may be thrown forwardly into impact with a part of the vehicle. The uniformity of the restraining force, compactness, economy of manufacture, and reusability of the energy absorption device are desirable for obvious reasons.

A general object of the present invention is to provide energy absorption devices which fulfill the above requirements.

A more specific object of the invention is to provide energy absorption devices of the character described wherein the kinetic energy of the load imposed on the devices is absorbed by nonelastic deformation, i.e., cold flow, of a malleable metal part, whereby rebound is avoided.

Another object of the invention is to provide improved energy absorption devices of the character described in which the distance through which the devices can yield under load is positively limited.

Yet another object of the invention is to provide improved energy absorption devices of the character described wherein the restraining force developed by the devices during yielding thereof remains substantially constant throughout the entire yield distance.

A further object of the invention is to provide improved energy absorption devices of the character described which are relatively compact, economical to manufacture, reusable, and otherwise ideally suited to their intended purposes.

Other objects, advantages, and features of the invention will become readily apparent as the description proceeds.

Three presently preferred embodiments of the present invention will now be described in detail by reference to the attached drawing, wherein:

FIG. 1 is a view in perspective of a vehicle seat having installed thereon seat belts embodying one form of the present energy absorption device;

FIG. 2 is an enlarged section taken along line 2—2 in FIG. 1;

FIG. 3 is an enlarged view looking in the direction of arrow 3 in FIG. 2;

FIG. 4 is a section taken along line 4—4 in FIG. 3;

FIG. 5 illustrates an alternative form of the present energy absorption device; and FIG. 6 illustrates yet another form of the present energy absorption device.

Referring to FIGS. 1-4 of this drawing, and especially to FIG. 1, the numeral 10 denotes a seat structure having a tubular framework 12 including a rear tubular frame member 14. Attached to this rear frame member 14 are seat belts 16. Each seat belt is made in two halves, 16a and 16b, which can be releasably joined at one end in the well-known way.

Each seat belt half 16a, 16b is anchored to the seat frame 12 by an energy absorption device 18 which is constructed in accordance with this invention and is attached to the rear frame member 14. This device is illustrated in detail in FIGS. 2-4. As shown in these latter figures, device 18 comprises a rotary body or wheel 20 of malleable metal. This wheel is rotatably mounted on a supporting part 22. Supporting part 22 comprises a yoke, one end of which is wrapped around the frame member 14 and is riveted thereto.

Wheel 20 is rotatably fitted between the arms 24 of the yoke 22. A bolt, or threaded pin, 26 passes through the yoke arms 24 and a bearing 28 in the wheel 20 for rotatably supporting the latter on the yoke arms 24.

In the relatively narrow periphery of the wheel 20 is an initially open, preformed groove 30. One end of this groove terminates at a first radial notch 32 in the wheel and the other end of the groove terminates at a second radial notch 34 in the wheel. Opposite the groove 30 is an axial hole 36 through the wheel.

Fitted within the groove 30 is a cable 38. One end of this cable extends through a passage 40 communicating the notch 32 and wheel hole 36. Tightly fitted on the cable, within the hole 36, is a ball or bead 42. The other end of the cable extends from the other end of the groove 30 through the notch 34, as shown. Fixed to the free end of the cable is a clevis 44 for attachment to a seat belt half 16a, 16b.

The side walls 46 of the groove 30 and the side faces 48 of the wheel 20 define therebetween relatively narrow peripheral flanges 50 on the wheel. The depth of groove 30 is substantially greater than the diameter of cable 38 so that flanges 50 project radially beyond the cable.

After the cable 38 is placed in the wheel groove 30, the wheel flanges 50 are bent inwardly toward one another and over the cable 38 to confine the latter in the groove 30, as illustrated in the upper half of FIG. 4. When a force is applied to the cable 38 in the direction of the arrow in FIG. 3, a torque is applied to the wheel 20 tending to rotate the same. As the wheel rotates, the cable 38 pulls out of the groove 30. To do this, of course, the cable must progressively spread the overlying wheel flanges 50, thereby deforming the metal of the wheel. This deformation of the metal absorbs energy. It is evident that the rate of energy absorption remains substantially constant during pull-out of the cable along the entire length of the cable groove.

It is further evident that the energy absorption characteristics of the energy absorption device 18 may be varied by varying the diameter of the wheel 20, the depth of the groove 30, the type of metal used in the wheel, the diameter of the cable 38 and its groove 30, and so forth. After the cable 38 has been completely pulled out of its groove 30, of course, the cable remains firmly attached to the wheel 30 by virtue of the bead 42 fixed on the cable. Accordingly, the effective extension of the energy absorption device 18 under load is limited to a preset maximum distance determined by the length of the cable groove 30. After the device undergoes this maximum extension or yield, it forms a rigid connection between the seat belt 16 and frame member 14. The maximum yield or extension of the device can obviously be varied by varying the length of the cable groove 30 or the diameter of the wheel 20.

FIG. 5 illustrates an alternative embodiment of the invention in which the wheel yoke 22a is formed into a loop and passes completely around the seat frame 14. The remainder of the energy absorption device is the same, however.

The energy absorption device 100 of FIG. 6 comprises a bar 102 of malleable metal. Formed in one longitudinal edge of this bar is a groove 104 which is originally open like the groove 30 in the energy absorption device of FIGS. 1–4. A cable 106 is placed in this groove, after which the flanges 107 defined by the groove are bent inwardly over the cable, as shown. One end of the cable 106 extends clear of the bar for connection to a seat belt, or the like, as in the earlier forms of the invention.

The other end of the cable 106 is inserted through a hole 108 in the adjacent end of the bar 102. This hole opens into a larger, transverse hole 110 in the bar. Positioned within the transverse hole 110 and tightly affixed to the adjacent end of the cable 106 is a ball or bead 112. This bead prevents the latter end of the cable from pulling out of the hole 108. The cable is, therefore, firmly attached to the bar 102.

Bar 102 is attached to a suitable part of the vehicle, such as a side member 12a of the seat frame 12 in FIG. 1, by bolts 114 which extend transversely through the bar. The bar is preferably arranged so that the fixed end of the cable is forward and the free end of the cable doubles back on itself and extends forwardly along and approximately parallel to the upper surface of the bar. In practice, of course, each half 16a and 16b of the seat belt 16 will be anchored to the seat frame 12 by one of the energy absorption devices 100.

During yielding of the energy absorption device 100 under load, the cable 106 is pulled from the groove 104 progressively from the rear end of the groove toward the forward end of the groove. The flanges 107 which are originally closed over the cable are spread as the cable pulls from the groove. This spreading of the flanges deforms the malleable metal of the bar which, in turn, absorbs energy as in the previous forms of the invention. After the cable has been pulled completely from the groove 104, the fixed end of the cable remains anchored to the bar.

The energy absorption device 100 is preferably mounted so that the cable doubles back on itself along and parallel to the grooved edge of the bar 102, as explained above, and the direction line of the force exerted on the cable is in line with this doubled-back portion for the reason that the distance through which the devices then effectively yields under load, i.e., the increase in the length L of the cable 106 between its free end and the forward end of the bar 102, is then equal to approximately twice the length of the cable which is pulled from the cable groove 104. In this way, a maximum yield distance is obtained with a cable groove, and, hence, a bar 102, of minimum length. The arrangement of FIG. 6, then, achieves a compact energy absorption device. The energy absorption device of FIG. 6 can be arranged, of course, so that the direction line of the force acting to pull the cable 106 from the cable groove 104 is at right angles to the cable groove or at some intermediate angle. The ratio of the effective yield distance of the device to the length of the cable groove will vary with the angle between the direction line of the force acting on the cable and the cable groove. An additional advantage of the energy absorption device of FIG. 6 is that the bar 102 can be conveniently made by an extrusion process.

It is evident that each of the illustrated energy absorption devices can be reconditioned for use by replacing the cable in the cable groove and reclosing the flanges of the device over the cable.

The energy absorption device of the invention has been described and illustrated in connection with a shock absorbing safety seat belt for an automotive vehicle or airplane because of its unique qualification for this use which is obvious from the preceding description. It is evident, however, that the invention is capable of other uses and applications. Accordingly, the invention should not be thought of as limited to use in connection with seat belts.

Clearly, therefore, the invention hereinbefore described and illustrated is fully capable of attaining the several objects and advantages preliminarily set forth. While certain presently preferred embodiments of the invention have been disclosed for illustrative purposes, numerous modifications in the design, arrangement of parts, and instrumentalities of the invention are possible within the spirit and scope of the following claims.

What is claimed is:

1. An energy absorption device comprising a generally flat, relatively thin, malleable metal body having opposite side faces, a relatively narrow edge, and separate preformed flanges along said edge terminating in edge faces, respectively, and defining therebetween a preformed groove extending parallel to said side faces, the length of said groove being many times the maximum thickness of said flanges, a cable fitted in said groove with one end of the cable extending beyond the body, means securing the other end of the cable to said body, and said flanges being bent inwardly toward one another to place said edge faces thereof in close proximity over said cable and thereby confine the latter in said groove, whereby when opposing forces are exerted on said one end of said cable and on said body in directions to pull said cable from said groove, said flanges are progressively spread and thus deformed by the cable, thereby absorbing energy.

2. An energy absorption device comprising a supporting part, a malleable metal body rotatably mounted on said part, said body being preformed with two separate, substantially parallel, circularly curved flanges approximately coaxial with the rotation axis of said body, said flanges defining therebetween a circular preformed groove coaxial with said axis, the length of said groove being many times the maximum thickness of said flanges, a cable fitted in said groove with one end of the cable extending beyond said body, means securing the other end of said cable to said body, and said flanges being bent inwardly toward one another to place said edge faces thereof in close proximity over said cable and thereby confine the latter in said groove, whereby when opposing forces are exerted on said one end of said cable and said supporting part in directions to pull the cable from said groove, said body is rotated on said supporting part and said flanges are progressively spread and thus deformed by the cable, thereby absorbing energy.

3. An energy absorption device comprising a supporting part, a malleable metal wheel rotatably mounted on said part and having a relatively narrow peripheral edge, and separate preformed flanges extending about the periphery of said wheel terminating in peripheral edge faces, respectively, and defining therebetween a preformed peripheral groove in the wheel, a cable fitted in said groove with one end extending beyond the wheel, means securing the other end of said cable to the wheel, and said flanges being bent inwardly toward one another to place said edge faces thereof in close proximity over said cable and thereby confine the latter in said groove, whereby when opposing forces are exerted on said one end of said cable and said supporting part in directions to pull said cable from said groove, said wheel is rotated on said supporting part and said flanges are progressively spread and thus deformed by said cable, thereby absorbing energy.

4. An energy absorption device comprising a malleable metal bar having opposite side faces, an edge, and separate preformed flanges along said edge terminating in edge faces, respectively, and defining therebetween a preformed groove in said edge of the bar, a cable fitted in said groove with one end of the cable extending beyond the bar, means securing the other end of said cable to the bar, and said flanges being bent inwardly toward another to place said edge faces thereof in close proximity over said cable and thereby retain the latter in said groove, whereby when opposing forces are exerted on said one end of said cable and on said bar in directions to pull said cable from said groove, said flanges are progressively spread and thus deformed by the cable, thereby absorbing energy.

5. An energy absorption device comprising a supporting part, a malleable metal wheel rotatably mounted on said part and having a peripheral groove terminating at one end in a first radial notch in the wheel and at its other end in a second radial notch in the wheel, there being a hole through the wheel opposite said first notch, a cable fitted in said groove and having one end extending through a passage communicating said first notch and hole, a bead on said cable within said hole, the other end of said cable extending through said second notch clear of the wheel, and the wall of said groove being closed over said cable.

6. An energy absorption device comprising a malleable metal body preformed with two separate, parallel flanges terminating in edge faces, respectively, and defining therebetween a groove, the length of said groove being many times the maximum thickness of said flanges, a cable fitted in said groove with one end of the cable extending beyond said body, means securing the other end of said cable to said body, and said flanges being bent inwardly toward one another to place said edge faces thereof in close proximity over said cable and thereby confine the latter in said groove, whereby when opposing forces are exerted on said one end of said cable and on said body in directions to pull said cable from said groove, said flanges are spread and thus deformed by the cable, thereby absorbing energy.

7. The subject matter of claim 4, wherein said groove opens through opposite ends of said bar, said one end of the cable extending through one open end of said groove, said other end of the cable extending through the other open end of said groove and being doubled back on itself and extending through a bore in the adjacent end of said bar, said bar having a second transverse bore intersecting said first-mentioned bore, and said means securing said other end of said cable to said body comprising a bead fixed to the latter cable end within said second bore.

References Cited in the file of this patent
UNITED STATES PATENTS

| | | |
|---|---|---|
| 2,156,294 | Kessenich | May 2, 1939 |
| 2,353,872 | Brickman | July 18, 1944 |
| 2,578,753 | Smith | Dec. 18, 1951 |
| 2,953,189 | Barash | Sept. 20, 1960 |
| 3,026,972 | Hendry et al. | Mar. 27, 1962 |